US008675045B2

(12) United States Patent
Marin et al.

(10) Patent No.: US 8,675,045 B2
(45) Date of Patent: Mar. 18, 2014

(54) METHOD OF SIMULATING BLUR IN DIGITALLY PROCESSED IMAGES

(75) Inventors: Gildas Marin, Charenton-le-Pont (FR); Marc Le Renard, Charenton-le-Pont (FR)

(73) Assignee: Essilor International (Compagnie Generale d'Optique), Charenton le Pont (FR)

( * ) Notice: Subject to any disclaimer, the term of this patent is extended or adjusted under 35 U.S.C. 154(b) by 671 days.

(21) Appl. No.: 12/809,594

(22) PCT Filed: Dec. 19, 2008

(86) PCT No.: PCT/EP2008/068019
§ 371 (c)(1),
(2), (4) Date: Sep. 21, 2010

(87) PCT Pub. No.: WO2009/077617
PCT Pub. Date: Jun. 25, 2009

(65) Prior Publication Data
US 2011/0001790 A1 Jan. 6, 2011

(30) Foreign Application Priority Data
Dec. 19, 2007 (EP) .................................... 07301705

(51) Int. Cl.
*H04N 13/00* (2006.01)
(52) U.S. Cl.
USPC .......................................................... 348/42
(58) Field of Classification Search
USPC .......................................................... 348/42
See application file for complete search history.

(56) References Cited
U.S. PATENT DOCUMENTS
6,570,566 B1 5/2003 Yoshigahara

FOREIGN PATENT DOCUMENTS
EP 1 018 691 7/2000
EP 1 862 110 12/2007
WO WO 02/29718 4/2002

OTHER PUBLICATIONS
Rigeur et al., "Real-Time Depth of Field Simulation", Shader X2, pp. 3-9 and 28-29, 2004.*

(Continued)

Primary Examiner — Richard Torrente
(74) Attorney, Agent, or Firm — Cozen O'Connor (57) ABSTRACT

In an image processing method, a first two-dimensional image (I(x, y)) of a three-dimensional scene is obtained. Each pixel location of a first image is associated with a respective distance parameter (z(x, y)) representing a distance of a viewer's eye to an object of the scene appearing at this pixel location in the first image. A respective spreading parameter ($\Phi_d$(x, y)) is determined for each pixel location as a function of the distance parameter associated with this pixel location, of a dioptric power ($P_{corr}$) of a portion of a correction lens simulated as placed along a ray extending between the viewer's eye and the object of the scene appearing at said pixel location in the first image, and of a simulated maximum accommodation power ($P_{acc}$) of the viewer's eye. A second, blurred two-dimensional image (I'(x, y)) is generated from the first image using a local convolution kernel varying across the image. This kernel can be made sparse, i.e. with a number of non-zero points much smaller than the number of points of a blur region whose dimension is given by the spreading parameter.

26 Claims, 5 Drawing Sheets

(56) References Cited

OTHER PUBLICATIONS

Shin, et al., "Blur Identification and Image Restoration Based on Evolutionary Multiple Object Segmentation for Digital Auto-focusing", IWCIA, 2004, pp. 656-668.

Rokita P., "Rendering Accommodation Effects in Virtual Reality Applications", Real-Time Imaging, Academic Press Ltd., G.B., vol. 1, No. 5, Nov. 1, 1995, pp. 355-361.

Krivanik, J. et al., "Fast depth of field rendering with surface splatting", Computer Graphics Int'l., Proceedings Jul. 9-11, 2003, Piscataway, NJ, USA.; pp. 176-181.

* cited by examiner

METHOD OF SIMULATING BLUR IN DIGITALLY PROCESSED IMAGES

RELATED APPLICATIONS

This is a U.S. national stage of application No. PCT/EP2008/068019, filed on Dec. 19, 2008.

This application claims the priority of European application no. 07301705.5 filed Dec. 19, 2007, the entire content of which is hereby incorporated by reference.

BACKGROUND OF THE INVENTION

The present invention relates to image processing and more particularly to techniques for simulating blurring effects in images to be displayed to a viewer. A field of application lies in virtual reality systems in which synthetic two-dimensional (2D) images are generated from a parametric representation of a three-dimensional (3D) scene. The images to which blurring effects can be added may also be obtained from one or more cameras whose output is digitally processed according to methods as disclosed below.

There exist methods of putting blur into digitally processed images. For example, motion blur can be generated by combining different images of a moving scene in an accumulation buffer as disclosed in "The Accumulation Buffer: Hardware Support for High-Quality Rendering", P. Haeberli and K. Akeley, Computer Graphics (SIGGRAPH 90 Conference Proceedings), pages 309-318, 1990. An accumulation buffer can also be used to create depth of field in a digitally processed image. In this case, the accumulation buffer integrates light traveling along different paths through the aperture of a simulated lens. A point which is out-of-focus will then appear blurred on the processed image.

Rather than combining several images to generate blur, other known methods use point spreading functions (PSF) respectively associated with the locations of the points or pixels making up a digital image. The blurred image is then calculated by means of a convolution operation between the original, usually sharp, image and the PSF which varies over the image. Mathematically, this can be expressed as:

$$I'(x, y) = \sum_{(u,v)} I(x-u, y-v) \cdot PSF_{x-u,y-v}(u, v) \quad (1)$$

where $I(x, y)$ and $I'(x, y)$ denote the respective values at pixel location $(x, y)$ of the sharp and blurred images and $PSF_{x,y}(u, v)$ denotes the value, for an offset $(u, v)$ of the point spreading function as determined for pixel location $(x, y)$.

Such a convolution method is capable of rendering a realistic blur if the PSF is accurately estimated.

It has been proposed, for example in EP 1 018 691 A1, to use it in an ocular optical system simulating method. In this context, a sharp image is first generated from parameters representing a synthetic 3D scene and a lens system simulated as being located in front of the viewer's eye. The first image includes distortions due to the optical correction provided by the simulated lens system. A PSF is then determined as a distribution of brightness on the retina originated from an object point. In order to evaluate the PSF accurately, it is necessary to divide the pupil aperture into a large number of small regions and to trace a large number of rays through a combined optical system including the simulated lens system and an eye model. The eye model may incorporate an accommodation capacity simulated for the viewer. Then the blurred image is calculated using an equation such as (1).

A problem encountered when practically implementing such a convolution method to generate blurred images is its complexity. Complexity arises from the number of multiplications and additions required by the convolution (1) computed for every pixel $(x, y)$, and from the accurate estimation of the PSF using a sophisticated eye model. This problem makes it a severe challenge to accurately synthesize blurred images in real-time video applications having image refreshing rates higher than 10 Hz or so. This challenge may be addressed by using very important computing resources, but then the cost of the simulation system may become prohibitive.

There is thus a need for image processing methods using suitable approximations to make it possible to generate blurred images with a reasonable computational complexity in the context of simulating perception obtained with different optical lens designs.

SUMMARY OF THE INVENTION

An image processing method is proposed, wherein a first two-dimensional image of a three-dimensional scene is obtained, each pixel location of the first image being associated with a respective distance parameter representing a distance of a viewer's eye to an object of the scene appearing at said pixel location in the first image. A respective spreading parameter is determined for each pixel location as a function of the distance parameter z associated with said pixel location, a dioptric power $P_{corr}$ of a portion of a correction lens simulated as placed along a ray extending between the viewer's eye and the object of the scene appearing at said pixel location in the first image, and a simulated maximum accommodation power $P_{acc}$ of the viewer's eye. The spreading parameter determined for said pixel location is conveniently:

proportional to $\frac{1}{z} + P_{corr}$ if $\frac{1}{z} < -P_{corr}$, zero if $-P_{corr} \leq \frac{1}{z} \leq -P_{corr} + P_{acc}$; and proportional to $\frac{1}{z} + P_{corr} - P_{acc}$ if $\frac{1}{z} > -P_{corr} + P_{acc}$.

A convolution operation based on the first image and the distribution of the spreading parameter is then applied to generate a second two-dimensional image with blur rendering.

A relatively simple model is used to render the blur distribution as a function of the distribution of $P_{corr}$ over the simulated correction lens and taking into account the maximum accommodation power of the viewer's eye. The simulation can make use of reasonable computation power to provide realistic simulations of the effect of different types of lens designs including multi-focal lenses and progressive addition lenses (PAL).

In an embodiment of the method, the convolution operation is applied such that at least one pixel of the second image having a pixel location has a respective value depending on values of pixels of the first image located in a respective region of the first image made of pixels spaced apart from said pixel location by less than a distance given by the spreading parameter determined for said pixel location. For at least some values of the spreading parameter, the aforesaid pixels of the first image on which the value of said pixel of the second image depends are in a limited number substantially smaller than a total number of pixels of the first image located in said region. In such an embodiment, the convolution may be expressed as follows, with the notations indicated hereabove:

$$I'(x, y) = \sum_{(u,v)} I(x-u, y-v) \cdot \Psi_{x,y}(u, v) \qquad (2)$$

where $\Psi_{x,y}(u, v)$ designates a local convolution kernel for an offset (u, v) from a pixel position (x, y).

Alternatively, the convolution operation may be applied such that at least one pixel of the first image having a pixel location contributes to values of pixels in a respective region of the second image made of pixels spaced apart from said pixel location by less than a distance given by the spreading parameter determined for said pixel location. For at least some values of the spreading parameter, the pixels of the second image to which the aforesaid pixel of the first image having said pixel location contributes are in a limited number substantially smaller than a total number of pixels of the second image located in said region. In this case, the convolution may be expressed as follows, with the same notations:

$$I'(x, y) = \sum_{(u,v)} I(x-u, y-v) \cdot \Psi_{x-u,y-v}(u, v) \qquad (3)$$

In both cases (2) and (3), the support of the local convolution kernel $\Psi_{x,y}(u,v)$ is sparse, i.e. it has a number of points much smaller than that of a conventional PSF. A typical point spreading function has non-zero values over a whole region made of pixels within a certain distance of the current pixel. In the present case, only a limited number of non-zero values are retained. For example, one may retain up to 10 to 50 pixels in the above-mentioned "region", i.e. up to 10 to 50 non-zero values in the local convolution kernel, whereas the "region" or support of the PSF typically include hundreds of pixels where an object of the scene is out-of-focus. The number of pixels distributed in the "region" can be limited not to exceed a fixed number smaller than the total number of pixels located in said region for certain values of the spreading parameter. For the lowest values of the spreading parameter (the viewed object is within the simulated accommodation range), the number of pixels will be smaller than the "fixed number".

By appropriately distributing the non-zero values of the kernel support, we can obtain a realistic, though not perfect, blur. Again, this is particularly suitable for real-time applications in which the second 2D images are computed with a refreshing rate higher than 10 Hz, preferably higher than 30 Hz, and most preferably higher than 60 Hz. The imperfection of the blurring effects, which may be detected when cautiously examining a still image, is in practice not detected in the case of a dynamic restitution of the images.

Virtual reality systems are typical of such real-time applications. In this case, the first 2D images too are computed with a refreshing rate higher than 10 Hz, preferably higher than 30 Hz, and most preferably higher than 60 Hz, as a function of a representation of the 3D scene and of detected spatial data including the position and orientation of the viewer's head. Another possibility is to derive the first 2D images from detected video frames obtained from at least one camera mounted on the viewer's head.

The method can be used in a stereoscopic vision system, the first and second 2D images then being generated as stereoscopic images.

In an embodiment, the spreading parameter determined for a pixel location also depends on a dioptric power of a portion of a correction lens simulated as placed along a ray extending between the viewer's eye and the object of the scene appearing at this pixel location in the first image.

Further parameters which may be taken into account to determine the spreading parameters include the simulated aperture of a pupil and the distance between the viewer's eye and a portion of a display surface where the object of the scene appearing at a pixel location in the first image is displayed.

Another aspect of the invention relates to a computer program product for installation in an imaging system, comprising instructions for carrying out a method as outlined above upon running of the program product by at least one processor of the imaging system.

Still another aspect of the invention relates to an imaging system, comprising:

an image source for obtaining a first two-dimensional image of a three-dimensional scene, each pixel location of the first image being associated with a respective distance parameter representing a distance of a viewer's eye to an object of the scene appearing at said pixel location in the first image;

a computer for determining a respective spreading parameter for each pixel location as a function of parameters including the distance parameter associated with said pixel location, a dioptric power of a portion of a correction lens simulated as placed along a ray extending between the viewer's eye and the object of the scene appearing at said pixel location in the first image, and a simulated maximum accommodation power of the viewer's eye, wherein the spreading parameter determined for said pixel location is:

proportional to $\frac{1}{z} + P_{corr}$ if $\frac{1}{z} < -P_{corr}$, zero if $-P_{corr} \leq \frac{1}{z} \leq -P_{corr} + P_{acc}$; and proportional to $\frac{1}{z} + P_{corr} - P_{acc}$ if $\frac{1}{z} > -P_{corr} + P_{acc}$, where z is the distance of the viewer's eye to said object of the scene, $P_{corr}$ is the dioptric power of said simulated correction lens portion and $P_{acc}$ is the simulated maximum accommodation power of the viewer's eye; and a blurred image generator for generating a second two-dimensional image by a convolution operation based on the first image and the distribution of said spreading parameter; and a display surface for displaying the second two-dimensional image to the viewer.

DESCRIPTION OF PREFERRED EMBODIMENTS

Figure 1:
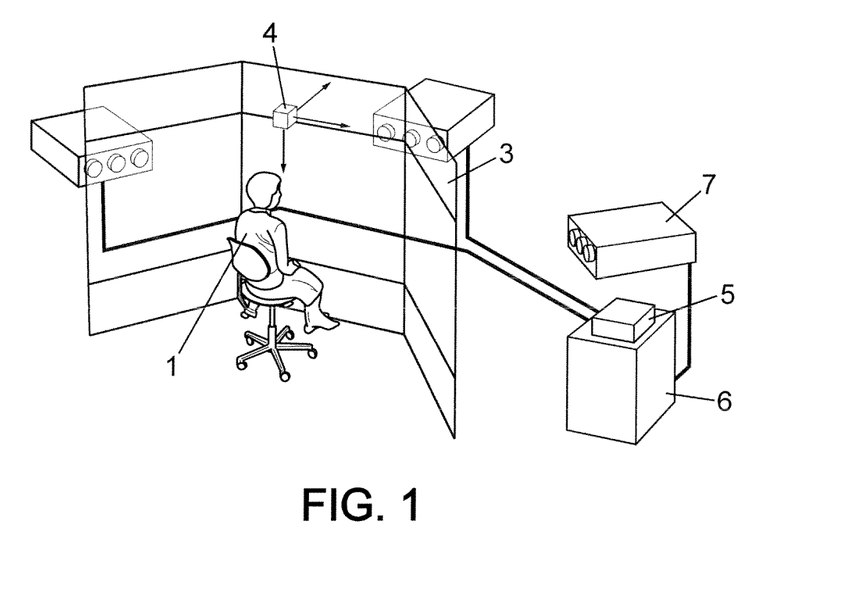
FIG. 1 shows a diagrammatic perspective view of an imaging system according to an embodiment of the invention.
Figure 2A:
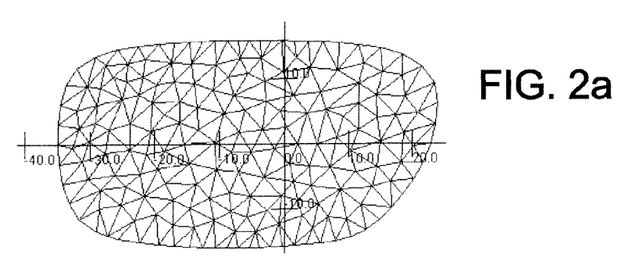
FIG. 2a-d show diagrammatic meshing used to generate stereoscopic images in a system as illustrated in FIG. 1.
Figure 2B:
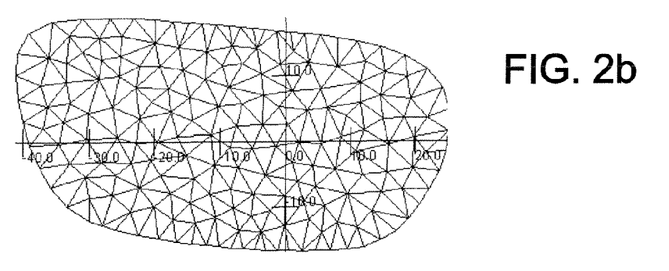
Figure 2C:
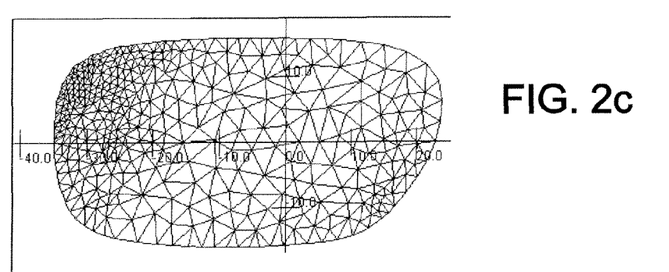
Figure 2D:
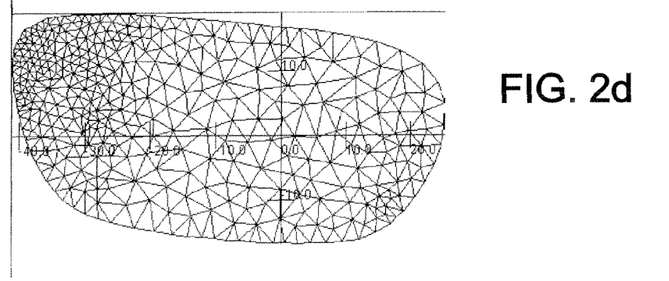
Figure 3:
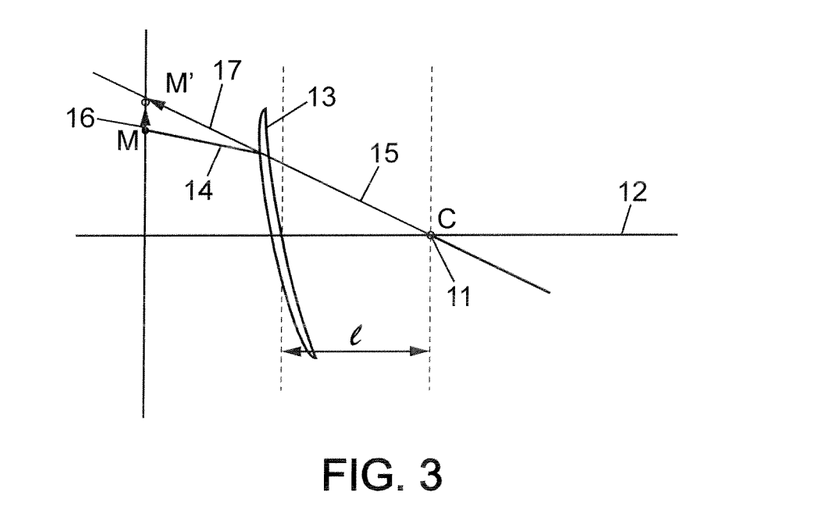
FIG. 3 is a diagram illustrating an optical path used to generate images in the system of FIG. 1.

FIGS. 1 to 3 relate to implementing an embodiment of a simulation method according to the invention. In this embodiment, stereoscopic images are projected to the viewer 1 and include optical effects of a lens design. The stereoscopic 2D images are calculated as a function of the 3D position and orientation of the viewer's head.

The viewer 1 faces three screens 3 defining display surfaces of a stereoscopic display with a 120° field of view. The position and orientation of the viewer's head is determined through a sensing system 4 linked to a position calculator 5. The position calculator 5 is linked to a computer system 6 to input the viewer's head position and orientation. The computer system 6 calculates stereoscopic images to be projected by three video projectors 7 on the screens 3.

Different known stereoscopic vision techniques can be used. For example, the stereoscopic channels can be time-multiplexed, in which case the viewer 1 wears synchronized electro-active shutter goggles. The multiplexing of the channels can also be based on frequency, and then the goggles have polarized lenses to provide the stereoscopic vision.

As an example, the sensing system 4 is part of a device worn on the head of the viewer, and is made with a position sensor for implementing virtual imaging, such as Fastrak Sensor commercialized by the company POLHEMUS. Other sensors such as Liberty commercialized by the company POLHEMUS, IS 900 commercialized by the company InterSence, or optical sensor such as ARTTrack commercialized by the company Advanced Realtime Tracking are also suitable.

As an example, the computer system 6 uses one or more graphic cards such as Nvidia Quadro® Fx3450 or Fx4600. It has one or more processors for running programs to generate the stereoscopic images based on parameters including the viewer's head position and orientation and on a parametric representation of a 3D scene.

Optical effects are generated as a function of a given lens design and a given head's position and orientation, for example by means of the process disclosed in EP 1 862 110 A1. The lens design is then simulated by means of a meshing as illustrated in FIG. 2. The initial meshing of the zone through the right eyeglass is shown on FIG. 2a. Distortions corresponding to the vision through an eyeglass of a given lens design are calculated at each intersection of the meshing as shown on FIG. 2b. As a function of this calculation, a meshing adapted to the level of distortion is calculated, as shown on FIG. 2c and the distortions are recalculated with this meshing, as shown on FIG. 2d. It is then possible to obtain a precise perception of a scene as viewed with eyeglass lenses of a given design.

A method to calculate optical effects may use ray tracing as illustrated in FIG. 3. The centre of rotation of the eye is referred as 11, the viewing axis as 12, and the lens as 13. The parameter l denotes the distance between the optical centre of the lens and the centre of rotation of the eye 11. An incident ray 14, coming from an object 16 located at a point M in the scene 2, is deviated by refraction through the lens 13 to form a ray 15 converging to the centre of rotation C of the eye 11, so that the viewer has the feeling that the ray comes from a point M' as ray 17.

To take into account the lens design, corresponding distortion is introduced as a vector MM' and the initial point M is shifted to point M'.

Following an embodiment, the computer system 6 makes a calculation at each intersection point of meshing 2a or 2c to obtain the distortion level of 2b or 2d respectively, using the ray tracing technique, where the distortion corresponding to a lens design is stored in a database of computer 6.

In a known manner, as a result of these computational steps, the computer system 6 obtains a first image I(x, y) for each eye which will generally be a sharp image. Such an image includes certain distortions as usually perceived by wearers of correction lenses, e.g. straight lines looking curved in peripheral vision, etc. However, the ray tracing technique determining offsets such as MM' in FIG. 3 normally does not reproduce blurring effects due defocusing. In order to simulate blur, some other technique must be used to process the first images. Different embodiments of such technique are discussed below.

Figure 4:
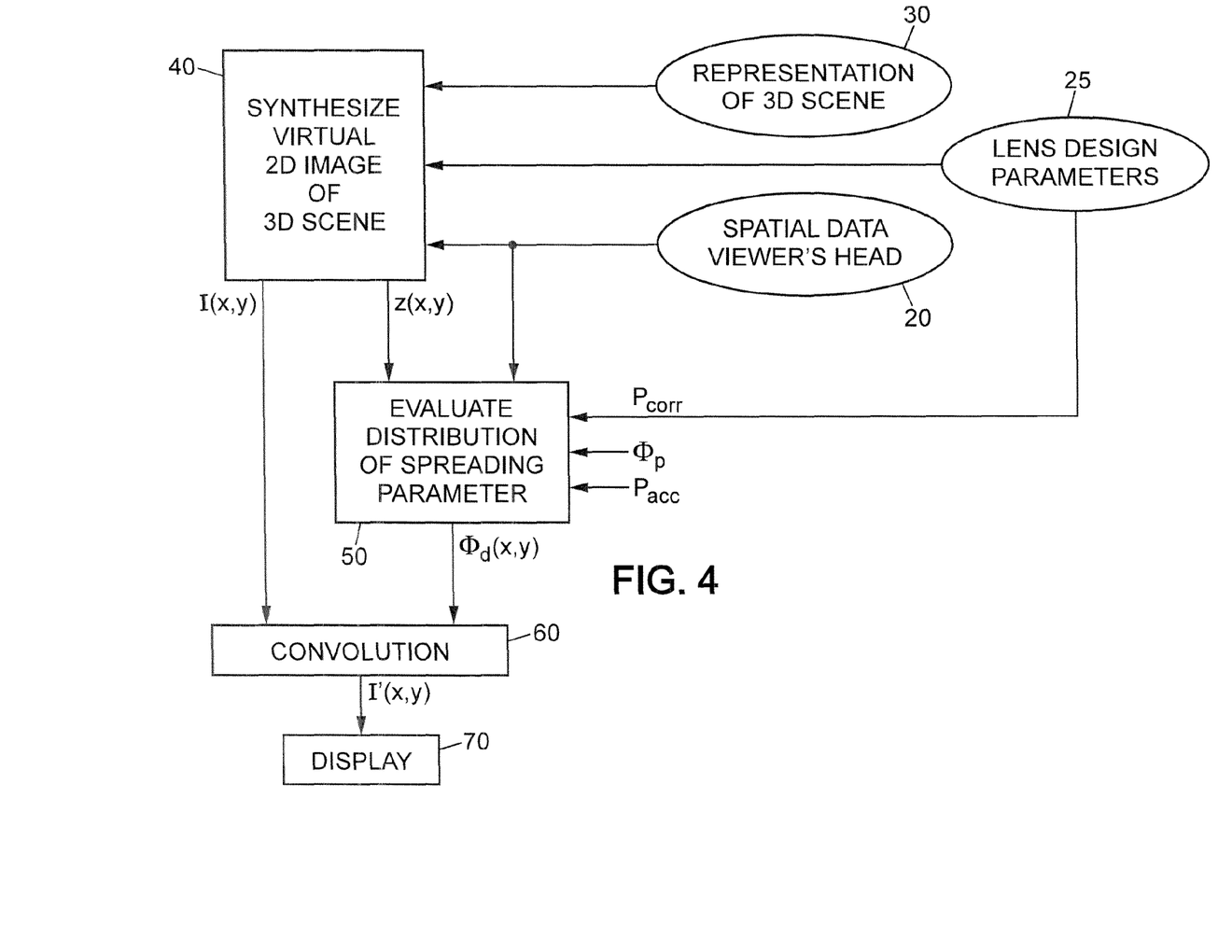
FIG. 4 is a flow chart illustrating an embodiment of an image processing method according to an embodiment of the invention.

FIG. 4 illustrates a simulation method executed by the computer system 6. Such a process can be run for each eye of the viewer 1 at each frame instant of the video system, in order to generate in real time a respective 2D moving image to be displayed for each eye (i.e. each stereoscopic channel). By virtue of the reduction of complexity of the process of generating blur, the refreshing rate of the images can be relatively high (more than 10 Hz) while following the actual movements of the viewer's head in real time. With a readily available computer system 6, refreshing rates of more than 30 Hz or even more than 60 Hz (e.g. 100 Hz) can be achieved.

The first step 40 of the method consists in synthesizing, for each eye, a first digital 2D image I(x, y), for example by means of the technique described above with reference to FIGS. 1-3. Such a (virtual) 2D image will generally be sharp. It is computed based (i) on the spatial data 20 representing the position and orientation of the viewer's head as detected by the sensing system 4, (ii) on parameters 25 defining a simulated lens design, and (iii) on parameters 30 forming the representation of the 3D environment in which the viewer will be virtually immersed. The latter parameters 30 are stored in an appropriate format (as usually employed in virtual reality applications) in a memory accessible to the computer system 6.

As a by-product of the synthesis step 40, the computer system 6 also outputs distance parameters z(x, y) associated with the pixel locations (x, y) in the first image I(x, y). The distance parameter z(x, y) associated with a pixel location (x, y) represents the distance of the viewer's eye 11 to the object 16 of the scene appearing at this pixel location in I(x, y). From the distribution of the distance parameter z(x, y), the spatial data 20 and the lens design parameters 25, the computer system 6 then proceeds to a step 50 of evaluating the distribution of a spreading parameter $\Phi_d(x, y)$.

Figure 5:
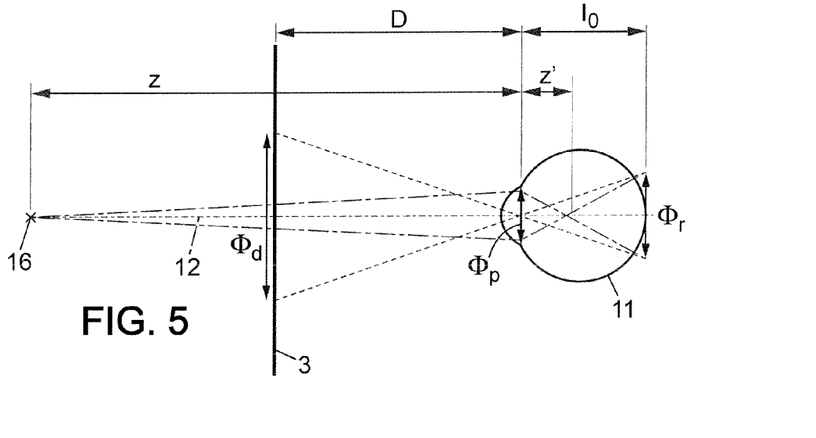
FIG. 5 is a diagram illustrating spatial relationships between a simulated object, a viewer's eye and a display of an imaging system.

To illustrate step 50, FIG. 5 shows spatial relationships between a point object 16 whose position is known in the simulated 3D scene, a viewer's eye 11 and the display surface 3 provided by a screen of the display system. The pixel indexes (x, y) are not included in FIG. 5 and in the explanations below.

Based on the parameters describing the predefined 3D scene and on the position data from the sensing system 4, indicating the position and orientation of the viewer's head, the program has determined the distance z between the wearer's eye (pupil) and the object 16. It also obtains the distance D between the wearer's eye (pupil) and the portion of the display surface 3 where the object 16 will be displayed (possibly with any offset MM' as determined when generating the first image). The parameter $I_0$ denotes the distance between the pupil and the retina.

FIG. 5 does not show a simulated correction lens, for simplicity. Depending on the optical power of any simulated correction lens in the direction of the viewing axis 12, the focus of the combined optical system including the correction lens and the cornea and crystalline lenses of the eye 11 is located at a distance z' from the pupil. Perfect focusing of an object at infinity on the retina occurs when $z'=I_0$. The point object 16 at distance D is imaged on the retina as a spot of diameter $$\Phi_r \approx \Phi_p \cdot \left| 1 - \frac{I_0}{z'} \right|$$

as illustrated by the dash-dot line in FIG. 5, where $\Phi_p$ designates the diameter (aperture) of the pupil. Approximately the same spot occurs on the retina if the point object 16 is displayed on the screen surface 3 with a diameter of $$\Phi_d \approx \Phi_r \cdot \left| \frac{D}{I_0} \right|$$

as illustrated by the dashed line in FIG. 5.

The object 16 is represented on the screen 3 as extending over a blur region whose diameter $\Phi_d$ can be referred to as the spreading parameter for the pixel location where the object 16 is displayed. If there is no correction lens, the spreading parameter $\Phi_d$ can be estimated as:

$$\Phi_d \approx \Phi_p \cdot D/z \qquad (4)$$

Now it is possible to introduce a correction lens design into the simulation of the blurring effects. A distribution of dioptric power $P_{corr}$ (in diopter units) forming part of the lens design parameters 25 is then mapped onto the extension of the simulated correction lens (FIG. 2). Each portion of the correction lens simulated as placed along a ray extending between the viewer's eye 11 and the object 16 is associated with a local value of the dioptric power $P_{corr}$ which is used to derive the value of the spreading parameter $\Phi_d$ determined for the pixel location at which the object 16 appears in the first image. In particular, the spreading parameter $\Phi_d$ can be approximated as:

$$\Phi_d \approx \Phi_p \cdot D \cdot \left( \frac{1}{z} + P_{corr} \right) \qquad (5)$$

The proportionality to $$\frac{1}{z} + P_{corr}$$

provides a good approximation of the combined effect of the distance z to the object and of the simulated dioptric power $P_{corr}$ of the correction lens. However, the accommodation capability of the viewer's eye is not simulated in this case. An assumption which is made is that the viewer 1 has a good vision of the screen 3 at distance D. So if he/she needs to have his/her eyesight corrected to have a sharp vision within the typical distance range from the display (e.g. D from 0.3 to 2 meters), actual correction lenses must be worn to use the imaging system. It is noted that the simulated dioptric power $P_{corr}$ for each eye does not represent such actual correction lenses which the user may (or may not) wear, but virtual correction lenses of which the parameters are used by the computing system 6 to generate the images.

In a practical simulator used to test the perception of various lens designs, the parameters (distribution of $P_{corr}$) of the design can be selected from a library of parameter sets representing available designs. The control panel of the simulator is used by an operator to select the lens designs of interest, in addition to other parameters including the positioning of the user with respect to the virtual 3D scene.

A maximum accommodation power of the viewer's eye is preferably taken into account in the simulation of the blurring effects. Again, the accommodation power $P_{acc}$ then introduced into the simulation is not the actual accommodation power of the viewer's eye, but a simulated value. The spreading parameter $\Phi_d$ can then be approximated as:

$$\Phi_d \approx \Phi_p \cdot D \cdot V_{corr} \qquad (6)$$

where:

$$\begin{cases} V_{corr} = \frac{1}{z} + P_{corr} & \text{if } \frac{1}{z} < -P_{corr} \\ V_{corr} = 0 & \text{if } -P_{corr} \leq \frac{1}{z} \leq -P_{corr} + P_{acc} \\ V_{corr} = \frac{1}{z} + P_{corr} - P_{acc} & \text{if } \frac{1}{z} > -P_{corr} + P_{acc} \end{cases} \qquad (7)$$

It will be appreciated that in the expression (4), (5) or (6) of the blur region diameter $\Phi_d$, the aperture $\Phi_p$ does not correspond to the actual pupil of the viewer 1 but of a simulated pupil, since the dash-dot line in FIG. 5 represents the virtual vision of the synthetic object 16. So $\Phi_p$ is a parameter of the simulation. It may be selected as a fixed value, for example $\Phi_p=5$ mm. Another possibility is to use a variable value of the aperture $\Phi_p$, which is adjusted automatically by the program as a decreasing function of the overall brightness of the virtual scene being viewed and/or as a decreasing function of the distance to the virtual object.

The spreading parameters $\Phi_d(x, y)$ evaluated in step 50 are used in step 60 to derive a convolution kernel $\Psi_{x,y}(u,v)$ which varies over the extension of the image. This kernel $\Psi_{x,y}(u,v)$ is combined in step 60 with the first synthetic image I(x, y) to obtain the blurred image I'(x, y) to be displayed at step 70 by means of projectors 7 and screens 3. The combination of $\Psi_{x,y}(u,v)$ and I(x, y) can be performed according to either equation (2) or (3).

Figure 6:
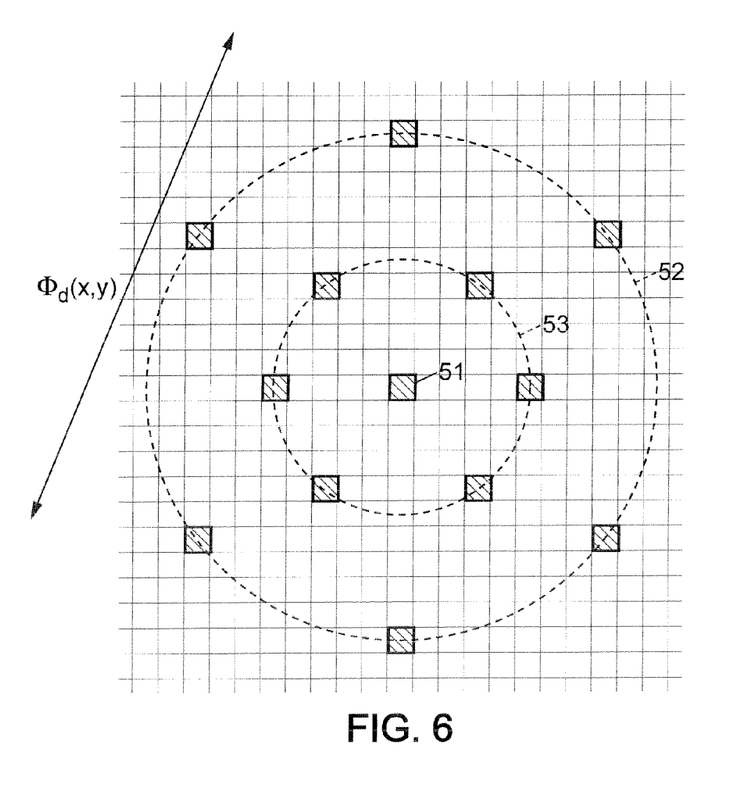
FIG. 6 is a diagram illustrating a possible form of a convolution kernel in a particular example.

FIG. 6 illustrates the grid of pixels in the 2D images in the vicinity of a given pixel 51 at location (x, y). The blur region is disc-shaped with the diameter $\Phi_d(x, y)$ centered on pixel location (x, y). In the illustrated example, the spreading parameter $\Phi_d(x, y)$ represents about 20 times the pixel pitch at the resolution of the display system at the level of the screen 3. Thus the blur region covers about 300 pixels. Convolving the first image I(x, y) with a varying convolution kernel consisting of a point spread function (PSF) extending over 300 discrete points or more is computationally severe. With practical defocusing magnitudes, the number of points of the PSF can even be significantly higher.

In order to alleviate this problem, it is proposed to use only a limited number of non-zero values of the convolution kernel $\Psi_{x,y}(u,v)$. If the convolution equation (2) is used, this means that for most values of the spreading parameter $\Phi_d(x, y)$, the number of pixels of the first image contributing to I'(x, y) is much smaller than the total number of pixels of the first image located in the whole disc-shaped blur region. If the alternative convolution equation (3) is used, it means that for most values of the spreading parameter $\Phi_d(x, y)$, the number of pixels of the second image to which I(x, y) contributes is much smaller than the total number of pixels of the second image located in the whole disc-shaped blur region.

In the example depicted in FIG. 6, the number of non-zero points of the convolution kernel $\Psi_{x,y}(u,v)$ is limited to 13. They are distributed in several circles centered on the pixel location (x, y):

the innermost circle (diameter 0) includes only the current pixel 51 at location (x, y);
the outermost circle 52 has a diameter $\Phi_d(x, y)$ and includes 6 pixels distributed at angular intervals;
the intermediate circle 53 has a diameter $\Phi_d(x, y)/2$ and includes 6 pixels distributed at angular intervals. The angular distribution of the non-zero pixels in the circles is preferably offset from on circle to another as shown in FIG. 6 so as to provide a relatively isotropic blur effect.

It will be appreciated that many types of distribution of the non-zero points of the convolution kernel $\Psi_{x,y}(u,v)$ within the blur region of diameter $\Phi_d(x, y)$ can be practically used, including random distributions. The number of non-zero points can be as large as about 50 or more while affording a significant gain in complexity over conventional PSF convolution.

The above technique is compatible with the use of image partitioning strategies to realize a hierarchical blur processing depending on the level of defocusing. Such partitioning strategies are discussed, e.g., in "Modeling the Perceptual Effects of Lens Distortion via an Immersive Virtual Reality System", J. Bastian, et al., Technical Report DHPC-086, University of Adelaide, South Australia, 2000.

Various kinds of optical correction lenses can be simulated by means of the above method, including correction for myopia, hypermetropia, astigmatism, etc. In the case of astigmatism, the blur can be adapted so that the blur regions consist of ellipses rather than discs, the ellipse having its longest axis aligned along the direction of astigmatism. In other words, the distance defining the blur region is an elliptic distance defined with respect to the astigmatism simulated for the viewer's eye or for the correction lens (sum of Euclidian distances to two points symmetrically disposed about the current pixel (x, y) and aligned on the direction of astigmatism).

Because the dioptric power $P_{corr}$ used in the blur simulation can be varied across the field of vision, multi-focal lenses and progressive addition lenses can be simulated with the above method.

Figure 7:
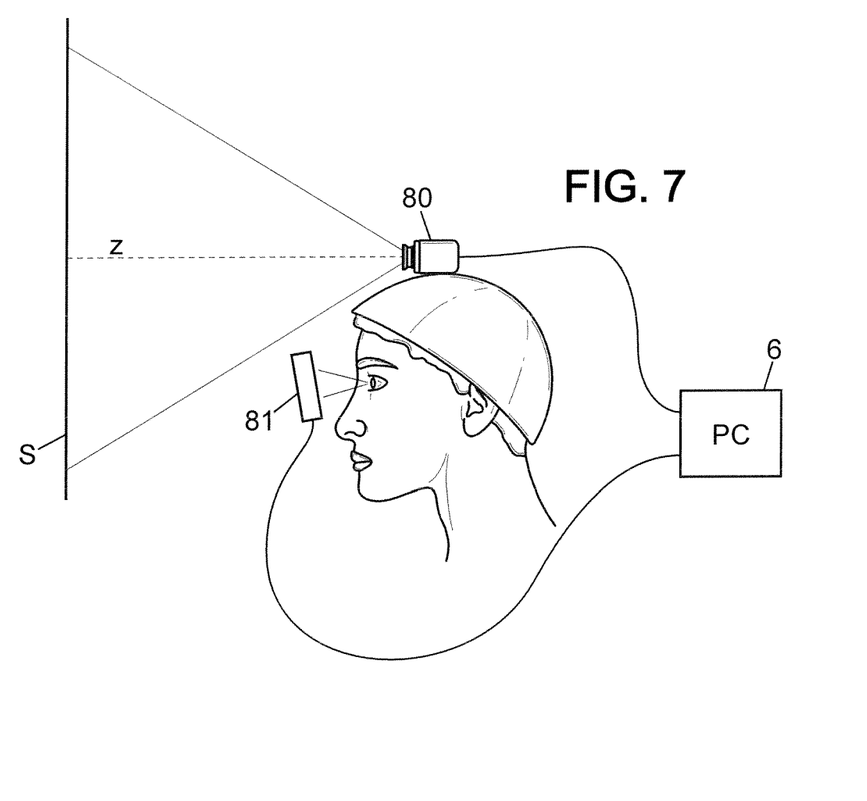
FIGS. 7 and 8 are diagrammatic side and top views of an alternative embodiment of an imaging system according to the invention.
Figure 8:
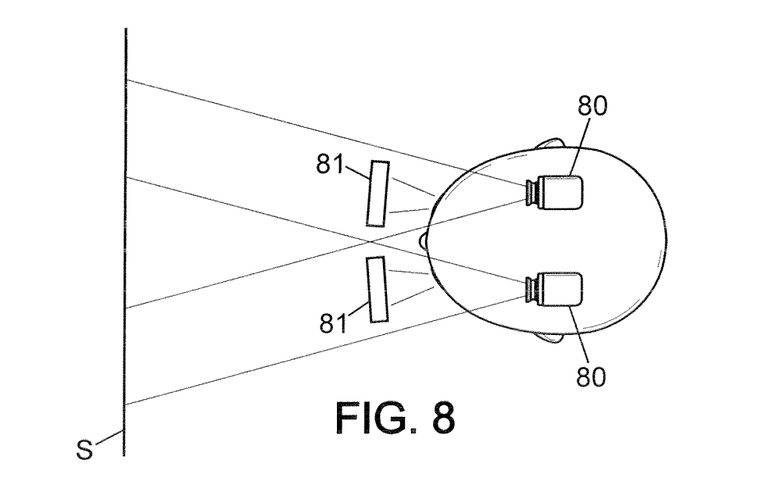

In the embodiment of FIGS. 7-8, the image source provided by the computer system 6 executing the image synthesis step 40, is replaced by an image pickup system including a pair digital video cameras 80 respectively positioned over the left and right eyes of the viewer for emulating stereoscopic vision. These cameras 80 form part of an immersive helmet assembly also including two near-vision displays 81, e.g. LCD devices, positioned in front of the wearer's eyes. The video signal frames from the two cameras 80 are supplied in real time to the computer system 6.

Each camera 80 also transmits its current auto-focus setting, from which the computing system 6 deduces the distance parameter z which, at each frame instant, may be treated as common to the whole scene S being viewed. The digital images output by each camera 80 are treated as described with reference to FIG. 4 to be converted into suitably distorted and blurred images provided to the near-vision display 81 corresponding to the same stereoscopic channel. Of course, the parameters D discussed previously with reference to FIG. 5 will correspond to significantly shorter distances in the case of FIGS. 7-8.

The invention claimed is:

1. An image processing method, comprising:
obtaining a first two-dimensional image of a three-dimensional scene, each pixel location of the first image being associated with a respective distance parameter representing a distance of a viewer's eye to an object of the scene appearing at said pixel location in the first image;
determining a respective spreading parameter for each pixel location as a function of parameters including the distance parameter associated with said pixel location, a dioptric power of a portion of a correction lens simulated as placed along a ray extending between the viewer's eye and the object of the scene appearing at said pixel location in the first image, and a simulated maximum accommodation power of the viewer's eye, wherein the spreading parameter determined for said pixel location is:

$$\text{proportional to } \frac{1}{z} + P_{corr} \text{ if } \frac{1}{z} < -P_{corr},$$

$$\text{zero if } -P_{corr} \leq \frac{1}{z} \leq -P_{corr} + P_{acc}; \text{ and}$$

$$\text{proportional to } \frac{1}{z} + P_{corr} - P_{acc} \text{ if } \frac{1}{z} > -P_{corr} + P_{acc},$$

where z is the distance of the viewer's eye to said object of the scene, $P_{corr}$ is the dioptric power of said simulated correction lens portion and $P_{acc}$ is the simulated maximum accommodation power of the viewer's eye; and
applying a convolution operation based on the first image and the distribution of said spreading parameter to generate a second two-dimensional image with blur rendering.

2. The method as claimed in claim 1, wherein the convolution operation is applied such that at least one pixel of the second image having a pixel location has a respective value depending on values of pixels of the first image located in a respective region of the first image made of pixels spaced apart from said pixel location by less than a distance given by the spreading parameter determined for said pixel location, and wherein, for at least some values of the spreading parameter, said pixels of the first image on which the value of said pixel of the second image depends are in a limited number substantially smaller than a total number of pixels of the first image located in said region.

3. The method as claimed in claim 1, wherein the convolution operation is applied such that at least one pixel of the first image having a pixel location contributes to values of pixels in a respective region of the second image made of pixels spaced apart from said pixel location by less than a distance given by the spreading parameter determined for said pixel location, and wherein, for at least some values of the spreading parameter, the pixels of the second image to which said pixel of the first image having said pixel location contributes are in a limited number substantially smaller than a total number of pixels of the second image located in said region.

4. The method as claimed in claim 2, wherein said limited number of pixels is limited not to exceed a fixed number smaller than the total number of pixels located in said region for certain values of the spreading parameter.

5. The method as claimed in claim 2, wherein the pixels of said limited number of pixels are distributed in a plurality of circles centered on said pixel location.

6. The method as claimed in claim 5, wherein the angular distribution of the pixels distributed in the plurality of circles is offset from one circle to another.

7. The method as claimed in claim 1, wherein the spreading parameters further depend on a simulated aperture of a pupil.

8. The method as claimed in claim 2, wherein the distance defining said region is an elliptic distance defined with respect to a simulated astigmatism.

9. The method as claimed in claim 1, further comprising the step of selecting correction parameters representing the simulated correction lens to be placed in front of the viewer's eye, said correction parameters being used to obtain the first two-dimensional image from the three-dimensional scene and to determine the spreading parameters.

10. The method as claimed in claim 1, wherein the second two-dimensional image is displayed on a display surface in front of the viewer, and wherein the spreading parameter determined for a pixel location is proportional to a distance between the viewer's eye and a portion of the display surface where the object of the scene appearing at said pixel location in the first image is displayed.

11. The method as claimed in claim 1, wherein the first and second two-dimensional images are computed with a refreshing rate higher than 10 Hz as a function of a representation of the three-dimensional scene and of detected spatial data including the position and orientation of the viewer's head.

12. The method as claimed in claim 1, wherein the first and second two-dimensional images are computed with a refreshing rate higher than 10 Hz, the first images being derived from detected video frames from at least one camera mounted on the viewer's head.

13. The method as claimed in claim 11, wherein the refreshing rate is higher than 30 Hz, and preferably higher than 60 Hz.

14. The method as claimed in claim 1, wherein the first and second two-dimensional images are each generated as stereoscopic images.

15. A non-transitory computer-readable medium having stored therein a computer program for installation in an imaging system, wherein said computer program comprises instructions for:
  obtaining a first two-dimensional image of a three-dimensional scene, each pixel location of the first image being associated with a respective distance parameter representing a distance of a viewer's eye to an object of the scene appearing at said pixel location in the first image;
  determining a respective spreading parameter for each pixel location as a function of parameters including the distance parameter associated with said pixel location, a dioptric power of a portion of a correction lens simulated as placed along a ray extending between the viewer's eye and the object of the scene appearing at said pixel location in the first image, and a simulated maximum accommodation power of the viewer's eye, wherein the spreading parameter determined for said pixel location is:

$$\text{proportional to } \frac{1}{z} + P_{corr} \text{ if } \frac{1}{z} < -P_{corr},$$

$$\text{zero if } -P_{corr} \leq \frac{1}{z} \leq -P_{corr} + P_{acc}; \text{ and}$$

$$\text{proportional to } \frac{1}{z} + P_{corr} - P_{acc} \text{ if } \frac{1}{z} > -P_{corr} + P_{acc}.$$

where z is the distance of the viewer's eye to said object of the scene, $P_{corr}$ is the dioptric power of said simulated correction lens portion and $P_{acc}$ is the simulated maximum accommodation power of the viewer's eye; and
  applying a convolution operation based on the first image and the distribution of said spreading parameter to generate a second two-dimensional image with blur rendering, upon running of the program product by at least one processor of said imaging system.

16. An imaging system, comprising:
  an image source for obtaining a first two-dimensional image of a three-dimensional scene, each pixel location of the first image being associated with a respective distance parameter representing a distance of a viewer's eye to an object of the scene appearing at said pixel location in the first image;
  a computer for determining a respective spreading parameter for each pixel location as a function of parameters including the distance parameter associated with said pixel location, a dioptric power of a portion of a correction lens simulated as placed along a ray extending between the viewer's eye and the object of the scene appearing at said pixel location in the first image, and a simulated maximum accommodation power of the viewer's eye, wherein the spreading parameter determined for said pixel location is:

$$\text{proportional to } \frac{1}{z} + P_{corr} \text{ if } \frac{1}{z} < -P_{corr},$$

$$\text{zero if } -P_{corr} \leq \frac{1}{z} \leq -P_{corr} + P_{acc}; \text{ and}$$

$$\text{proportional to } \frac{1}{z} + P_{corr} - P_{acc} \text{ if } \frac{1}{z} > -P_{corr} + P_{acc},$$

where z is the distance of the viewer's eye to said object of the scene, $P_{corr}$ is the dioptric power of said simulated correction lens portion and $P_{acc}$ is the simulated maximum accommodation power of the viewer's eye;
  a blurred image generator for generating a second two-dimensional image by a convolution operation based on the first image and the distribution of said spreading parameter; and
  a display surface for displaying the second two-dimensional image to the viewer.

17. The system as claimed in claim 16, wherein the convolution operation is such that at least one pixel of the second image having a pixel location has a respective value depending on values of pixels of the first image located in a respective region of the first image made of pixels spaced apart from said pixel location by less than a distance given by the spreading parameter determined for said pixel location, and wherein, for at least some values of the spreading parameter, said pixels of the first image on which the value of said pixel of the second image depends are in a limited number substantially smaller than a total number of pixels of the first image located in said region.

18. The system as claimed in claim 16, wherein the convolution operation is such that at least one pixel of the first image having a pixel location contributes to values of pixels in a respective region of the second image made of pixels spaced apart from said pixel location by less than a distance given by the spreading parameter determined for said pixel location, and wherein, for at least some values of the spreading parameter, the pixels of the second image to which said pixel of the first image having said pixel location contributes are in a limited number substantially smaller than a total number of pixels of the second image located in said region.

19. The system as claimed in claim 17, wherein said limited number of pixels is limited not to exceed a fixed number smaller than the total number of pixels located in said region for certain values of the spreading parameter.

20. The system as claimed in claim 16, wherein the distance defining said region is an elliptic distance defined with respect to a simulated astigmatism.

21. The system as claimed in claim 16, further comprising a selector for selecting correction parameters representing the simulated correction lens to be placed in front of the viewer's eye, wherein the image source is arranged to obtain the first two-dimensional image depending on said correction parameters, and wherein the blurred image generator is arranged to determine the spreading parameters depending on said correction parameters.

22. The system as claimed in claim 16, wherein the spreading parameter determined for a pixel location is proportional to a distance between the viewer's eye and a portion of the display surface where the object of the scene appearing at said pixel location in the first image is displayed.

23. The system as claimed in claim 16, further comprising a sensing system for detecting spatial data including the position and orientation of the viewer's head, wherein the first and second two-dimensional images are computed with a refreshing rate higher than 10 Hz as a function of a representation of the three-dimensional scene and of the detected spatial data.

24. The system as claimed in claim 16, further comprising at least one camera for mounting on the viewer's head, wherein the first and second two-dimensional images are computed with a refreshing rate higher than 10 Hz, and wherein the image source is arranged to derive the first images from detected video frames from said at least one camera.

25. The system as claimed in claim 23, wherein the refreshing rate is higher than 30 Hz, and preferably higher than 60 Hz.

26. The system as claimed in claim 16, wherein the first and second two-dimensional images are each generated as stereoscopic images, the system further comprising adapted stereoscopic vision goggles for wearing by the viewer.

\* \* \* \* \*